United States Patent Office 2,824,514
Patented Feb. 25, 1958

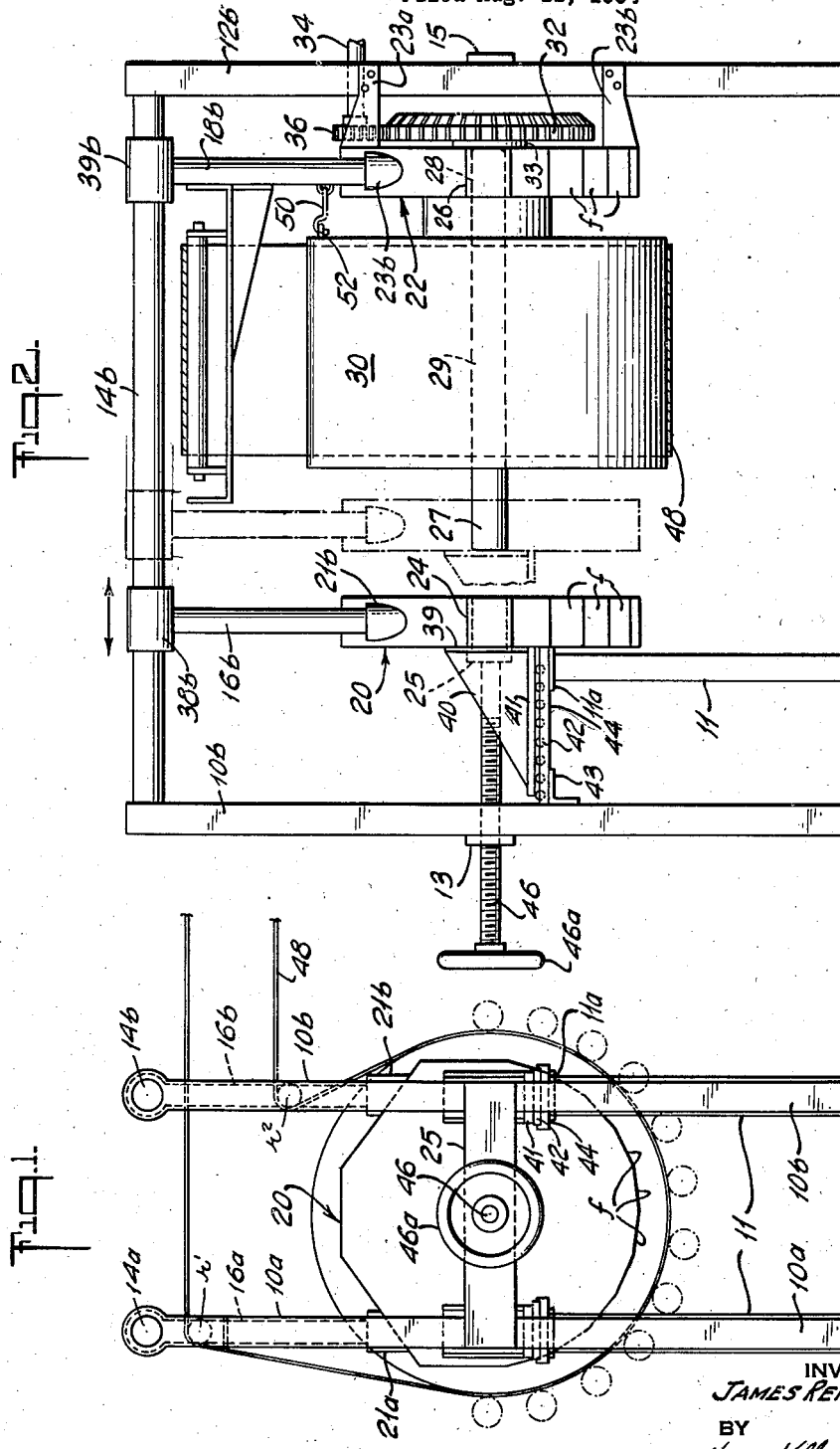

2,824,514

SUPPORT MEANS FOR A HEAVY CYLINDER AND THE LIKE

James Reid Johnson, Providence, R. I.

Application August 11, 1954, Serial No. 449,177

10 Claims. (Cl. 101—178)

This invention relates to support means for a heavy cylindrical member facilitating removal and replacement of an endless member extending partly around said cylindrical member.

A problem has long existed in connection with textile printing apparatus for example, in which a large cylinder is employed as a backing for a plurality of print rolls and a heavy rubber blanket extends partly around the backing cylinder and one or more other support rollers and serves as a cushioning backing for a length of cloth to be printed while the cloth is passing partly around the cylinder between the cylinder and the print rolls.

Occasionally the rubber blanket has to be removed and replaced. In the past this operation has been exceedingly difficult and time consuming both because of the great weight and size of the backing cylinder, and because it has been necessary to largely dismantle the support frame and place temporary support means under the cylinder, in addition to removing the print rolls.

It is accordingly an object of this invention to provide support means for heavy cylindrical members which comprises a bearing which is movable toward and away from an end of a cylinder to receive or to disconnect one end of the cylinder shaft or trunnion member receivable in said bearing.

Another object of the invention is to provide means whereby the cylindrical member may be temporarily supported from one end, and one bearing separated from the cylinder shaft without dismantling the support frame, leaving the other end free and unsupported so that an endless member such as a rubber blanket may be slipped off or on the cylinder over that end.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is an end elevation showing support means embodying the invention, applied to the support of a large backing cylinder of a textile printing machine having a number of print rolls at spaced intervals around a portion of the periphery of the cylinder and an endless member extending partly around the cylinder between the cylinder and the print rolls; and Figure 2 is a front elevation of the support means shown in Figure 1.

The support means comprises two pair of end standards 10a and 10b and 12a and 12b interconnected at the top by the horizontal frame members 14a and 14b. The members 10a and 10b are interconnected intermediate their ends by the horizontally extending frame means 13, and the members 12a and 12b are interconnected by the horizontally extending frame means 15. Depending from the members 14a and 14b are the two support arms 16a and 16b which are attached at their lower ends to the member 20, by being screwed into the bosses 21a and 21b respectively, on opposite sides of bearing 24, and the two support arms 18a and 18b which are attached at their lower ends to member 22, by being screwed into the bosses 23a and 23b respectively, on opposite sides of bearing 26. Members 20 and 22 are disposed at opposite ends of a cylinder 30 rotatably supported upon the shaft 29 the ends 27 and 28 of which are respectively received and supported in said bearings 24 and 26. Members 20 and 22 may themselves be substantially cylindrical but their surfaces are defined by series of flats $f$ to which the support means for print rolls may be respectively attached.

It is immaterial to this application whether cylinder 30 is rotated, and if so by what means. In the application of the invention illustrated cylinder 30 is rotated by frictional contact. The print rolls $p$ are driven for rotation (by means not shown) from a ring gear 32 on the stub shaft 33 which projects outwardly from member 22 and the drive is imparted to gear 32 by drive shaft 34 through gear 36 thereon. As is well understood in the art color is applied to the print rolls $p$ and they are moved against the surface of a cloth to be printed which is led between the print rolls and the endless heavy blanket 48 which extends partly around backing cylinder 30 and over guides $r^1$ and $r^2$.

The support arms 18a and 18b are fixed in position, their collars 39a and 39b being fixed on the horizontal support means 14a and 14b respectively in any suitable way. Support arms 16a and 16b depend from the collars 38a and 38b respectively which are slidable on members 14a and 14b respectively to permit the member 20 in which is the bearing 24, to be moved between the operative position shown in dotted lines in Figure 2 to the position shown in full lines where it is completely disengaged from cylinder shaft 29 and spaced axially outward from the shaft end 27.

The support member 22 is connected to end standards 12a and 12b by the horizontally extending brackets 23a and 23b, which coact with arms 18a and 18b in rigidly supporting member 22. Means now to be described are provided for coacting with arms 16a and 16b to support member 20 for sliding movement toward and away from cylinder 30.

As shown in Figure 2 the member 20 has projecting from it two sets of support members for helping to slidably support member 20 in alignment with shaft 29 and to facilitate its movements toward and away from operative position, the sets being preferably horizontally aligned and disposed on either side of bearing 24. The sets are interconnected by the cross member 25 to which extends the threaded rod or screw 46 which by operation of the hand wheel 46a serves to actuate member 20 and said two sets for movement toward and away from shaft 29 as will be described. Since the two sets are similarly constructed like numerals are applied to each and it is only necessary to describe one of them. Each set comprises two triangular members 40 projecting outwardly from the member 20, the members 40 being interconnected by the cross member 39 extending horizontally across the outer face of member 20, and by the base member 41 joining the bases of said members 40. Base member 41 rests on the roller bearings 42 which are provided on the horizontally disposed plate 44, which is supported on the top 11a of frame means 11 and on the bracket means 43 fixed to an upright frame member 10a or 10b. The adjusting screw means 46 extends through, and is threadedly engaged in, the frame cross member 13 and its inner end is connected to the cross member 25 which interconnects the inner members 40 of said two sets. Consequently by rotation of hand wheel 46a at the outer end of adjusting screw means 46 the member 20 and the two assemblies projecting therefrom which are supported on the roller bearing raceways 42 may be moved from a position in which the bearing 24 receives and supports the end 27 of shaft 29 to a position axially aligned with shaft 29 but removed laterally from the end 27 of said shaft leaving space between the end of said shaft and said member 20 through which said endless blanket member 48 may be inserted edgewise and positioned extending partly around the cylinder 30 and over the guide rolls $r^1$ and $r^2$.

For temporarily coacting with the support provided by fixed bearing 26 of member 22 I provide on frame member 18b the hook member 50 which is engageable with the eye 52 projecting from the end of the cylinder which is adjacent member 22. Interengagement of members 50 and 52, coacting with the support provided by the bearing 26 of member 22, serve to temporarily support cylinder 30 in substantially its normal horizontal position during removal and replacement of an endless member such for example as the rubber blanket 48 used in connection with textile printing apparatus, thus maintaining the end 27 of shaft 29 in a position of alignment with bearing 24 in member 20 and ready to receive said bearing when the assembly comprising member 20 is slid on plates 44 toward cylinder 30 into the position shown in dotted lines in Figure 2 for receiving and supporting the end 27 of shaft 29.

By the means described the operation of removing and replacing an endless member from around a heavy, supported cylinder is greatly simplified and the time and labor required is very materially reduced thus effecting an important saving in the operation of such apparatus over a period of time.

It should be understood that the present disclosure is for the purpose of illustration only and that this invention includes all modifications and equivalents which fall within the scope of the appended claims.

What I claim is:

1. In textile printing apparatus in which an endless member is interposed between a heavy backing cylinder and one or more print rolls a combination of, a frame including a pair of supports having bearings for receiving and rotatably supporting said backing cylinder between them, one of said supports being fixed in position and the other being movable from a position to support one end of said backing cylinder to a non-support position axially aligned with said backing cylinder but laterally removed therefrom, leaving space between itself and said backing cylinder for passing an endless member over and partly around said cylinder, and means engageable with means on said cylinder adjacent its periphery to co-act with the bearing of said fixed support to temporarily support said cylinder while the bearing of said movable support is in non-support position.

2. The combination claimed in claim 1 including guide rollers for guiding said endless member to and away from the backing cylinder and means for rotatably supporting said guiding rollers respectively, each of said means being fixed at one end to said fixed support and projecting toward said movable support.

3. Textile printing apparatus comprising a backing cylinder, support means for the cylinder including a pair of bearings one of which is moveable toward and away from the cylinder, support means for the bearings respectively, and means for temporarily supporting said cylinder from one end to permit an endless member encircling the cylinder and extending between said bearing support means to be removed and another endless member substituted while the said movable bearing support is disconnected for one end of said cylinder, a support surface spaced laterally from said backing cylinder and disposed on the far side of said movable support from said backing cylinder, and means carried by said movable support coactive with said support surface for making sliding engagement between said movable support member and said support surface when the movable support member is disengaged from the backing cylinder.

4. The combination claimed in claim 3 including a screw-threaded rod connecting at its inner end to said movable support and means for supporting and threadedly engaging said rod whereby rotation of said rod serves to move said movable support toward and away from said backing cylinder from and to said support surface, from the position of the said support member in which it is operative for co-acting with the fixed support to support said cylinder with said endless member extending around it to the position in which it is resting on said support surface and is disengaged from said backing cylinder.

5. In textile printing apparatus in which an endless blanket is led over guide rolls to and partly around a heavy backing cylinder means for making it possible to insert or remove an endless blanket without moving the backing cylinder which comprises, a frame including a fixed bearing for one end of said cylinder and a moveable bearing, moveable along the frame axially in a straight line from a position in which it supports the other end of said cylinder to a non-supporting position, means supplementary to the frame for supporting the moveable bearing throughout its movement to facilitate moving said moveable bearing and accurate register of the moveable bearing with the backing cylinder when it is returned to supporting position, and means supplementary to the fixed bearing for supporting said backing cylinder when said moveable bearing is in non-supporting position and maintaining it in position for accurate register with the moveable bearing when the moveable bearing is returned to supporting position.

6. In textile printing apparatus in which an endless blanket is led over guide rolls to and partly around a heavy backing cylinder means for making it possible to insert or remove an endless blanket without moving the backing cylinder which comprises, a frame including two substantially cylindrical members having around their peripheries a number of flats for attachment of the support means for print rolls and having aligned bearings, horizontally extending means for suspending said members in parallel relation and spaced apart to receive and support said backing cylinder between them, one of said means being fixed, supports for said guide rolls projecting from said fixed means respectively to position said guide rolls in parallel with said backing cylinder, the other of said means being moveable on said suspending means, in a straight line toward and away from the backing cylinder, and supplementary means for supporting said moveable means comprising a horizontal slideway and a slide projecting from said moveable member, on the far side thereof from said cylinder, and resting on said slideway.

7. The combination claimed in claim 6, including means projecting from said fixed member and means on said backing cylinder, said two means being interengageable to provide supplementary means for supporting said backing cylinder when said moveable member is in non-supporting position.

8. In textile printing apparatus in which an endless blanket is led over guide rolls to and partly around a heavy backing cylinder means for making it possible to insert or remove an endless blanket without moving the backing cylinder which comprises, a frame comprising two pairs of uprights, two horizontal members supported on said pairs respectively and two cylinder support assemblies suspended from said horizontal members, and each comprising a substantially cylindrical portion having around its periphery a series of flats for attachment of the support means for print rolls, and two arms interconnecting said portion and said horizontal members respectively, the arms of one of said assemblies being fixed on said horizontal members and the arms of the other of said assemblies being slideable along said horizontal support members, and means, coacting with the arms which are slideable, to support part of the weight of the substantially cylindrical portion suspended from said arms, comprising a slideway, parallel to the horizontal frame member on which said arms are slideable, and a slide projecting from the substantially cylindrical portions, on the far side thereof from said cylinder, and riding on said slideway, whereby part of the weight on said slideable arms is relieved thereby facilitating sliding of said arms on said horizontal frame members.

9. In textile printing apparatus in which an endless blanket is led over guide rolls to and partly around a heavy backing cylinder means for making it possible to insert or remove an endless blanket without moving the backing cylinder which comprises, a frame comprising horizontal means, a pair of vertical support assemblies suspended from said horizontal means, each assembly comprising a substantially cylindrical member having around its periphery a series of flats for attachment of support means for print rolls, and means for engaging an end of said backing cylinder, said pair of substantially cylindrical members being disposed in parallel relation and spaced apart to receive and support said backing cylinder between them, one of said support assemblies being fixed on said frame horizontal means and the other assembly being moveable along the frame to cause its substantially cylindrical component to move in a straight line from a position in which it engages and helps support said backing cylinder to a position in which it is disengaged from the backing cylinder and spaced therefrom to permit an endless member to be slipped over the backing cylinder from the unsupported end.

10. In a machine for printing cloth comprising a heavy backing cylinder, one or more print rolls movable toward and away from the backing cylinder and an endless blanket member normally extending around the backing cylinder and interposed between the print roll means and the backing cylinder, guide means for guiding said endless member partly around said backing cylinder, a plurality of bearings for rotatably supporting said backing cylinder, support means for said bearings respectively, means for connecting said guide means between said support means including means for detachably connecting said guide means to one of said support means and means for moving said one of the support means away from said backing cylinder and from said guide means to provide space between said support means and said backing cylinder and said guide means through which an endless blanket member may be withdrawn from or inserted around said backing cylinder and said guide means.

References Cited in the file of this patent

UNITED STATES PATENTS

| | | |
|---|---|---|
| 758,546 | Manahan | Apr. 26, 1904 |
| 1,678,894 | Wood | July 31, 1928 |
| 1,737,378 | Little | Nov. 26, 1929 |
| 2,129,699 | Luehrs | Sept. 13, 1938 |
| 2,460,504 | Huebner | Feb. 1, 1949 |
| 2,587,606 | Dungler | Mar. 4, 1952 |